(12) United States Patent
Barre et al.

(10) Patent No.: US 12,009,594 B2
(45) Date of Patent: Jun. 11, 2024

(54) DEVICE FOR DETECTING IDENTIFICATION ELEMENTS WITH RELAYING METASURFACE(S), FOR A SYSTEM

(71) Applicant: PSA AUTOMOBILES SA, Poissy (FR)

(72) Inventors: Laurent Barre, Paris (FR); Denis Albert Delporte, Proville (FR); Pascal Duverger, Noisy Le Roi (FR)

(73) Assignee: PSA AUTOMOBILES SA, Poissy (FR)

( * ) Notice: Subject to any disclaimer, the term of this patent is extended or adjusted under 35 U.S.C. 154(b) by 260 days.

(21) Appl. No.: 17/770,014

(22) PCT Filed: Oct. 19, 2020

(86) PCT No.: PCT/FR2020/051876
§ 371 (c)(1),
(2) Date: Apr. 18, 2022

(87) PCT Pub. No.: WO2021/099706
PCT Pub. Date: May 27, 2021

(65) Prior Publication Data
US 2022/0393362 A1  Dec. 8, 2022

(30) Foreign Application Priority Data
Nov. 18, 2019  (FR) ...................................... 1912826

(51) Int. Cl.
*H01Q 15/14* (2006.01)
*H01Q 1/32* (2006.01)

(52) U.S. Cl.
CPC ......... *H01Q 15/148* (2013.01); *H01Q 1/3291* (2013.01)

(58) Field of Classification Search
CPC ............... H01Q 15/148; H01Q 1/3291; H01Q 15/0066; H01Q 1/2216
(Continued)

(56) References Cited

U.S. PATENT DOCUMENTS

| 8,188,845 B2 * | 5/2012 | Abernethy, Jr. ........... G09F 9/33 296/21 |
| 8,842,056 B2 | 9/2014 | Batchelor |

(Continued)

FOREIGN PATENT DOCUMENTS

FR  3070795 A1  3/2019

OTHER PUBLICATIONS

International Search Report for PCT/FR2020/051876 mailed Jan. 20, 2021.
(Continued)

*Primary Examiner* — Omar Casillashernandez
(74) *Attorney, Agent, or Firm* — Sandberg Phoenix & von Gontard P.C.

(57) ABSTRACT

A detection device (DD) is fitted in a system (S) comprising a closed space (EF) with a metallic environment and comprising objects (O) provided with wave-transmitting/receiving identification elements. Said device (DD) comprises an identification reader (LI) which exchanges messages with the identification elements (EI) via a wave-transmitting/receiving antenna (AER), which reader is installed inside the closed space (EF), in order to detect the presence of said waves, and a metasurface (MS1) installed inside the closed space (EF) and configured so as to reflect, according to a first chosen law, waves which originate from the antenna (AER) and are intended for the identification elements (EI) and, according to a second chosen law, waves which originate from the identification elements (EI) and are intended for the antenna (AER).

8 Claims, 4 Drawing Sheets

(58) Field of Classification Search
USPC .......................................................... 340/438
See application file for complete search history.

(56) References Cited

U.S. PATENT DOCUMENTS

| | | | | |
|---|---|---|---|---|
| 2009/0009853 A1* | 1/2009 | Tonucci | ............. | H01Q 15/0066 |
| | | | | 359/298 |
| 2010/0109841 A1* | 5/2010 | Yamada | ............... | H01Q 15/008 |
| | | | | 340/10.1 |
| 2011/0095940 A1* | 4/2011 | Breed | ............... | B60R 21/01536 |
| | | | | 342/146 |
| 2014/0070943 A1* | 3/2014 | Breed | ..................... | G01S 17/88 |
| | | | | 340/539.22 |
| 2017/0313269 A1* | 11/2017 | Breed | ................. | G01F 23/2962 |
| 2018/0032770 A1* | 2/2018 | Yaginuma | ............ | H01Q 1/2216 |

OTHER PUBLICATIONS

Written Opinion for PCT/FR2020/051876 mailed Jan. 20, 2021.
Elek, Francis et al., "Dispersion Analysis of the Shielded Sievenpiper Structure Using Multiconductor Transmission-Line Theory", IEEE Microwave and Wireless Components Letters, vol. 14, No. 9, pp. 434-436, Sep. 2004, DOI: 10.1109/LMWC.2004.832075 ISSN: 1531-1309, XP011117289.

* cited by examiner

DEVICE FOR DETECTING IDENTIFICATION ELEMENTS WITH RELAYING METASURFACE(S), FOR A SYSTEM

CROSS-REFERENCE TO RELATED APPLICATIONS

This application is the US National Stage under 35 USC § 371 of International Application No. PCT/FR2020/51876, filed 19 Oct. 2020 which claims priority to French Application No. 1912826 filed 18 Nov. 2019, both of which are incorporated herein by reference.

TECHNICAL FIELD

The invention relates to systems that comprise at least one closed space with a metallic environment and comprising at least one object provided with a wave-transmitting/receiving identification element, and more precisely to the detection of identification elements in such systems.

BACKGROUND

Some systems comprise at least one closed space in which objects provided with a wave-transmitting/receiving identification element can be housed, more or less temporarily. This is, for example, the case, although non-limitingly, for certain vehicles (such as utility vehicles or trucks (possibly with trailers)).

Usually, the waves emitted have frequencies belonging to the radiofrequency (RF) domain, and the Identification elements are radiofrequency identification tags (or markers) comprising an electronic chip associated with an RF antenna. This is called radiofrequency identification (or RFID).

In order to detect whether the aforementioned objects are present in the closed space of a system, it has been proposed to install an identification reader in this closed space that is responsible for exchanging messages with the identification elements of these objects via a wave-transmitting/receiving antenna. It will be noted that the wave-transmitting/receiving antenna may optionally form part of the casing of the identification reader, but this is not necessary. If they are separate, the antenna and the identification reader are generally coupled via a cable.

When the closed space has a metallic environment, such as when it is defined by a vehicle body, detection is not typically done well, and therefore identification elements present in the closed space are not detected (e.g., they are masked by at least one other nearby object and/or by a metallic element and/or by collision of RF waves) or on the contrary identification elements located outside the closed space are detected. This problem of incomplete and/or external detection results not only from the positioning of the wave-transmitting/receiving antenna relative to the objects in the closed space, but also from the configuration and the metallic environment of the enclosed space.

Currently, to partially remedy the aforementioned problem, several antennas are associated with the identification reader, and these antennas are positioned in different locations of the closed space (for example on the sides, on the ceiling and on the floor). However, this increases not only the costs but also the likelihood of detecting an object outside the closed space, and therefore this forces the addition of antennas outside the closed space to limit false detections (for internal/external discrimination). But there is also a problem of positioning an antenna relative to the door controlling access to the closed space.

The object of the invention is, in particular, to improve this situation.

SUMMARY

For this purpose, a detection device is proposed which, on the one hand, is intended to be fitted in a system comprising a closed space with a metallic environment and comprising at least one object provided with a wave-transmitting/receiving identification element, and, on the other hand, comprising an identification reader that exchanges messages with each identification element, via at least one wave-transmitting/receiving antenna, which reader is intended to be installed in the closed space, in order to detect the presence of the identification elements.

This detection device comprises at least one metasurface intended to be installed inside the closed space and configured so as to reflect, according to at least one first-chosen law, waves that originate from the antenna(s) and are intended for each identification element and, according to at least one second-chosen law, waves that originate from each identification element and are intended for the antenna.

Here, the term "metasurface" means a surface having a thickness less than the wavelength of the waves that it must reflect and produced in a structured metamaterial (with horizontal patterns having a size less than the aforementioned wavelength) or in an unstructured material. A metamaterial is an artificial composite material with electromagnetic properties that a natural material does not have, and in particular an ability to modulate the behavior of electromagnetic waves owing to specific boundary conditions.

Owing to the detection device, the probability of reaching the objects to be identified and the probability of reaching the antenna are very significantly increased, and therefore the identification of the objects present in a closed space with a metallic environment is optimized.

The detection device may comprise other features that may be included separately or in combination, and in particular:

each metasurface can be configurable. In this case, each metasurface may comprise a computer comprising at least one processor and at least one memory arranged to perform the operations of determining each first law and each second law as a function of the metallic environment and of a configuration of the closed space, then determining each configuration of the configurable metasurface according to the first and second determined laws, and then triggering an establishment of each configuration by the configurable metasurface;

the processor and the memory can be arranged to carry out the operations of determining at least two first laws and a second law according to the metallic environment and the configuration of the closed space, then determining a first configuration of the configurable metasurface as a function of one of these first determined laws and of the second determined law and a second configuration of the configurable metasurface as a function of the other of these first determined laws and of the second determined law, and then triggering successive establishments of these first and second configurations by the configurable metasurface;

the processor and the memory can be arranged, in the event at least one door controlling access to the closed space is opened, to carry out the operations of determining a third law of reflection of the waves that originate from the antenna toward an area comprising the access and a fourth law of reflection of the waves that originate from this area comprising the access to the antenna, then determining a configuration of the configurable metasurface as a function of these determined third and fourth laws, and then triggering an establishment of this configuration by the configurable metasurface;

each first law can be intended to cause a reflection of the waves that is chosen from among a reflection along successive directions parallel to one another and which constitute generatrixes of a cylinder of revolution having a radius chosen by at least one chosen area of the metasurface and a reflection along a single direction from chosen areas of the metasurface that are aligned on a chosen straight line;

the transmitted waves may have frequencies that belong to the radiofrequency domain;

alternatively, the waves can be photons.

Additionally a system is proposed comprising a closed space with a metallic environment and at least one detection device of the type presented above.

For example, this system can constitute a vehicle.

In this case, the vehicle can, for example, be a utility vehicle in which the closed space is defined by an at least partially metallic body and comprises an upper wall defining a roof and an inner face on which each metasurface is secured, or indeed a truck in which the closed space is a body or a trailer that is at least partially metallic and an upper wall defining a roof and comprising an inner face on which each metasurface is secured.

BRIEF DESCRIPTION OF THE FIGURES

Other features and advantages of the invention will appear on examining the detailed description below, and the attached drawings, in which.

DETAILED DESCRIPTION

A detection device DD is intended to be fitted in a system S, comprising a closed space EF having a metallic environment and in which objects O can be placed, each object being provided with a wave-transmitting/receiving identification element EI, in order to detect the presence of these objects O.

In what follows, it is considered, by way of non-limiting example, that the system S is a vehicle. It is for example a truck, as illustrated non-limitingly in FIGS. 1 to 3. However, the system is not limited to a truck. It relates in fact to any type of system comprising at least one closed space having a metallic environment and in which objects can be placed that are provided with a wave-transmitting/receiving identification element. Thus, it concerns land vehicles (and in particular utility vehicles and trucks (with or without a trailer)), boats, aircraft, safes, buildings and facilities (possibly industrial).

Figure 1:
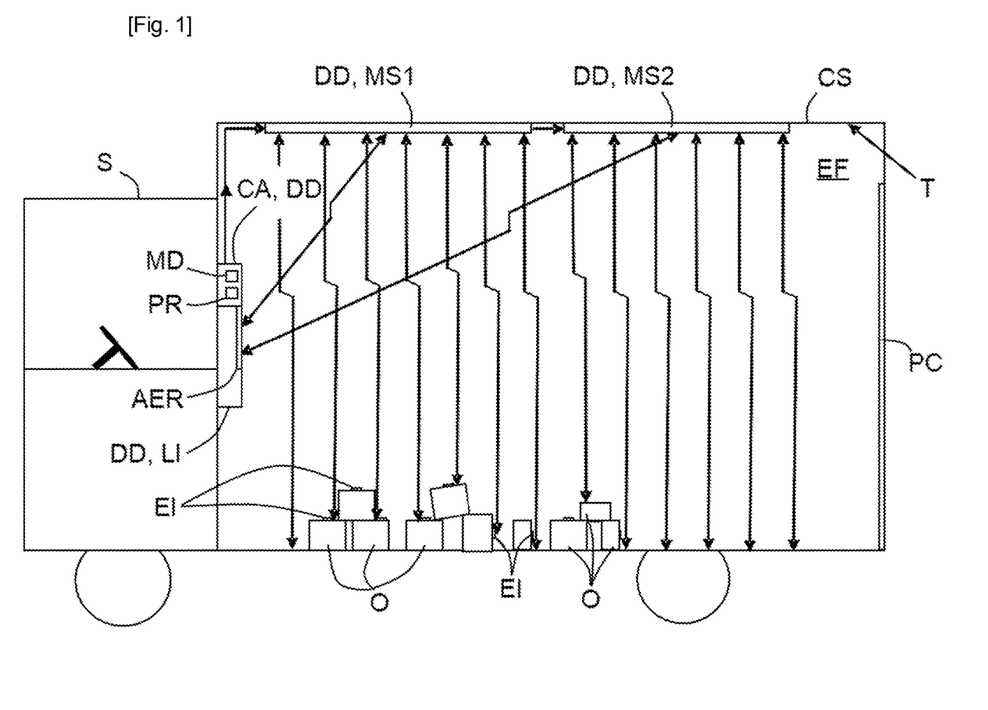
FIG. 1 schematically and functionally illustrates an example of a truck comprising a closed space comprising objects provided with identification elements and an exemplary embodiment of a detection device, using a first example of first and second laws of reflection, FIG. 2 schematically and functionally illustrates the truck of FIG. 1 with its detection device using a second example of first and second reflection laws, FIG. 3 schematically and functionally illustrates the truck of FIG. 1 with its detection device using an example of third and fourth laws of reflection in the presence of the open access door, and FIG. 4 schematically and functionally illustrates an embodiment of a computer of a detection device.
Figure 2:
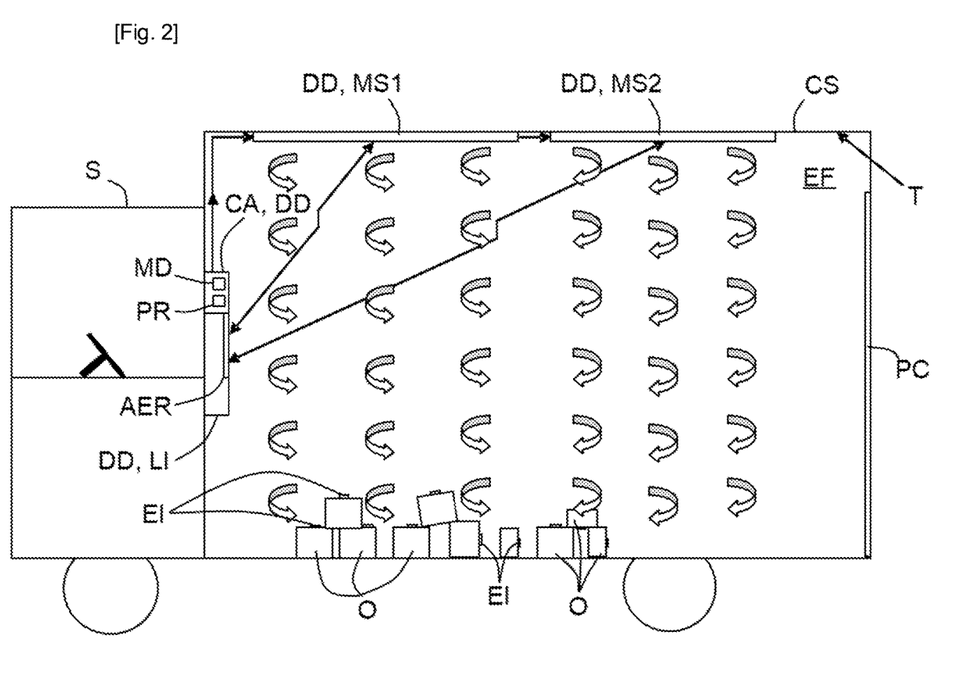
Figure 3:
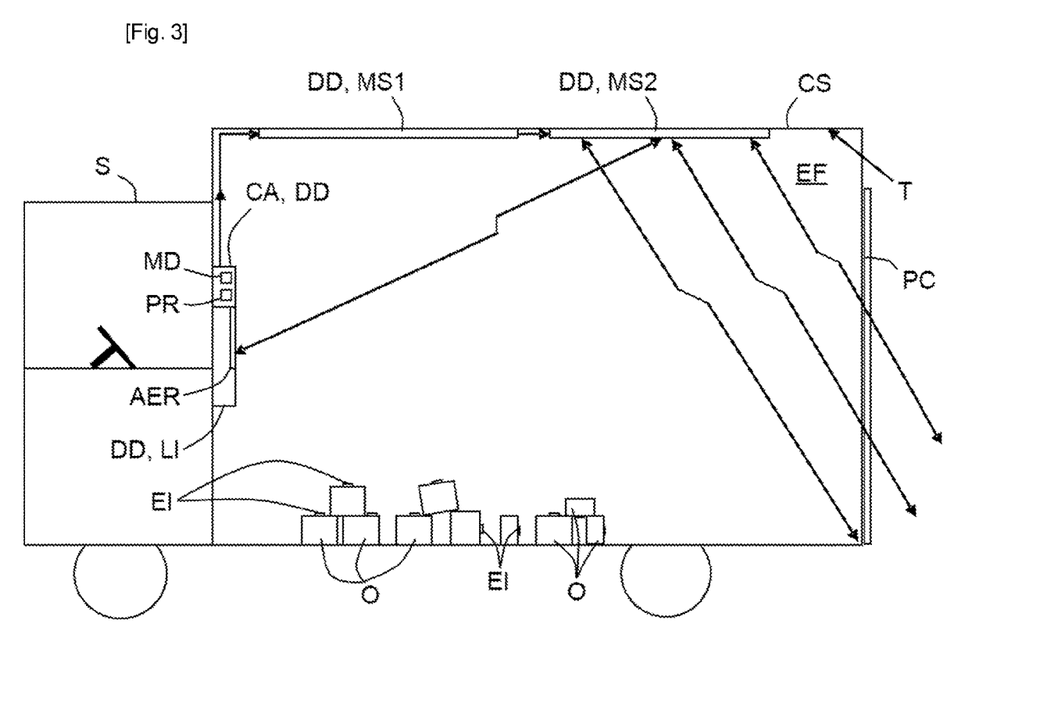

FIGS. 1 to 3 schematically show a system S (here a truck) comprising a closed space EF having a metallic environment and comprising objects O each provided with an identification element EI and an embodiment of a detection device DD.

In this example, the system S is a vehicle, and more specifically a truck comprising a body CS, fixedly secured to its chassis, at least partially metallic, and defining a closed space EF to which access is controlled by at least one door PC. It will be noted that the body CS could be part of a trailer.

The objects O housed in the closed space EF can be of any type. Thus, they may be, for example, packets (or parcels) to be transported or equipment (such as tools (drill, screwdriver, grinder, electric saw, etc.)). It will be noted that the system applies when there is at least one object O present in the closed space EF and provided with a wave-transmitting/receiving identification element EI.

A wave-transmitting/receiving identification element EI comprises a wave-transmitting/receiving antenna associated with an electronic chip that is on standby most of the time and is awakened and energized by specific waves that it receives from an antenna associated with an identification reader. This electronic chip stores at least one identifier that represents the object with which it is associated.

As illustrated in FIGS. 1 to 3, a detection device DD comprises an identification reader LI, at least one wave-transmitting/receiving antenna AER, and at least one metasurface MSj.

It is recalled here that the term "metasurface" means a surface having a thickness less than the wavelength of the waves that it must reflect and produced in a metamaterial that may be structured with horizontal patterns having a size less than the aforementioned wavelength or unstructured. A metamaterial is an artificial composite material with electromagnetic properties that a natural material does not have, and in particular an ability to modulate the behavior of electromagnetic waves owing to specific boundary conditions.

The antenna AER is intended to be installed in the closed space EF. It will be noted that it may be part of the casing of the identification reader LI, as in the example illustrated non-limitingly in FIGS. 1 to 3. However, this is not necessary. Indeed, it may be remote (or offset) from the casing of the identification reader LI, while being coupled to the identification reader LI, for example via a cable.

In what follows, it is considered, by way of non-limiting example, that the waves emitted by the antenna AER and by each identification element EI have frequencies belonging to the radiofrequency (or RF) domain. As a result, radiofrequency identification (or RFID) is carried out here. However, the device/system is not limited to the waves belonging to the radiofrequency domain. In fact, it can use any frequency range that is not dangerous for humans. Thus, the identification waves can be photons.

Furthermore, it is considered in what follows, by way of non-limiting example, that the detection device DD only comprises a single antenna AER. However, it could comprise several (at least two).

The identification reader LI is arranged to exchange messages with each identification element EI present in the closed space EF, via the antenna EAR, in order to detect the presence of the identification element EI. For example, identification reader LI can be arranged to determine whether objects are absent in the closed space EF by comparing the identifiers received from the identification elements EI with a stored list of identifiers, or only to record all the identifiers received from the identification elements EI, or to compare a previous load with the current load, or to alert when an identification element EI is no longer present in the closed space EF.

Each metasurface MSj is intended to be installed in the closed space EF. In the example illustrated non-limitingly in FIGS. 1 to 3, each metasurface MSj is fixedly secured to the inner face of the upper wall T of the body CS that constitutes the roof. However, a metasurface MSj may be installed in any other location in a closed space, provided that this location allows the waves to be returned effectively to the objects O (and more precisely to their identification elements EI) and to the antenna AER.

Furthermore, in the example illustrated non-limitingly in FIGS. 1 to 3, the detection device DD comprises two metasurfaces MSj. However, the number of metasurfaces MSj may take any value greater than or equal to one (1).

Each metasurface MSj is configured in such a way as to reflect, and possibly also to modulate (possibly the intensity), according to at least a first-chosen law, the waves that originate from the antenna AER and are intended for the identification element(s) EI and according to at least one second-chosen law, the waves that originate from an (the) identification element(s) EI and are intended for the antenna AER.

In other words, each metasurface MSj has a configuration that makes it possible to send back, on the one hand, the waves that it receives from the antenna AER in the direction of at least part of the closed space EF (where at least some of the objects O are placed), and, on the other hand, the waves that it receives from one or more objects O in the direction of the antenna AER. It therefore acts as a bidirectional wave relay. This allows a very significant increase in the probability of reaching the objects to be identified and the probability of reaching the antenna AER, and therefore allows optimized identification of the objects O present in the closed space EF with a metallic environment.

In the example illustrated non-limitingly in FIG. 1, the first metasurface MS1 (j=1, the leftmost) has a first configuration allowing it to reflect the waves originating from the antenna AER toward a first area where a first part of the objects O is located according to a first first-chosen law and the waves originating from the objects O of this first part toward the antenna AER according to a first second-chosen law, and the second metasurface MS2 (j=2, the rightmost) has a second configuration allowing it to reflect the waves originating from the antenna AER toward a second area where a second part of the objects O is located according to a second first-chosen law and the waves originating from the objects O of this second part toward the antenna AER according to a second second-chosen law.

In the example illustrated non-limitingly in FIG. 2, the first metasurface MS1 has a third configuration allowing it to reflect the waves originating from the antenna AER toward the first area where the first part of the objects O is located according to a third first-chosen law and the waves originating from the objects O of this first part toward the antenna AER according to a third second-chosen law, and the second metasurface MS2 has a fourth configuration allowing it to reflect the waves originating from the antenna AER toward the second area where the second part of the objects O is located according to a fourth first-chosen law and the waves originating from the objects O of this second part toward the antenna AER according to a fourth second-chosen law.

As illustrated non-limitingly in FIGS. 1 to 3, each metasurface may advantageously be configurable, and the detection device DD may comprise a computer CA comprising at least one processor PR and at least one memory MD.

The term "configurable metasurface" here means a metasurface that can be configured by programming. For this purpose, it is possible to use, for example, so-called Huygens (or optical) metasurfaces. Thus, electrically or mechanically or optically or even thermally controllable metasurfaces can be used. In the case of a mechanical control, the metasurface can, for example, comprise diodes associated with micro-electro-mechanical systems (or MEMS), which are themselves controlled by integrated circuits of the FPGA type ("Field Programmable Gate Array") or programmable microcontrollers or programmable chips with an integrated system (or PSoC ("Programmable System on a Chip")) or else possibly complex programmable logic devices (or (C)PLD).

The computer CA is made in the form of a combination of electrical or electronic circuits or components (or "hardware") and software modules (or "software"), due to the fact that it comprises at least one processor PR and at least one MD memory.

For example, the processor PR may be a digital signal processor (or DSP). This processor PR may comprise integrated (or printed) circuits, or else several integrated (or printed) circuits connected by wired or wireless connections. An integrated (or printed) circuit is understood to mean any type of device capable of performing at least one electrical or electronic operation.

The memory MD is RAM memory in order to store instructions for implementation by the processor PR of a computer program.

The processor PR and the memory MD are arranged to carry out the operations of determining each first law and each second law according to the metallic environment and the configuration of the closed space EF, then determining each configuration of a configurable metasurface MSj as a function of these determined first and second laws, and then triggering the establishment by each configurable metasurface MSj of each configuration relating to it and also possibly to adjust the power of the antenna AER via the identification reader LI (if needed).

This may in particular allow adaptation of the detection device DD according to the closed space EF considered and/or the objects O present in the closed space EF and/or the areas where the objects O are placed.

This can also allow the establishment of several different configurations (possibly successively) within the same closed space EF in order to further increase the probability of identifying the objects O. To this end, the processor PR and the memory MD can be arranged to carry out the operations of determining at least two first laws and a second law according to the metallic environment and the configuration of the closed space EF, then determining a first configuration of each configurable metasurface MSj as a function of one of these first determined laws and of this second determined law and a second configuration of each configurable metasurface MSj as a function of the other of these first determined laws and of the second determined law, and then triggering successive establishments of these first and second configurations by each configurable metasurface MSj. In other words, the first configuration is established to perform a first presence detection (or identification), then the second configuration is established to perform a second presence detection (or identification), complementary to the first presence detection.

It will be noted that the processor PR and the memory MD may also be arranged, in the event the (at least one) door PC controlling access to the closed space EF is opened, to carry out the operations of determining a third law of reflection of the waves that originate from the antenna AER toward an area comprising this access and a fourth law of reflection of the waves that originate from this area comprising the access to the antenna AER, then determining a configuration of each configurable metasurface MSj as a function of these determined third and fourth laws, and then triggering an establishment of this configuration by each configurable metasurface MSj concerned.

This is particularly the case in the example illustrated non-limitingly in FIG. 3. In this example, the first configurable metasurface MS1 is not used because the objective is to identify objects entering (or leaving) the closed space EF through the open access door PC. Conversely, the second configurable metasurface MS2 has a fifth configuration allowing it to reflect the waves originating from the antenna AER toward a third area containing the opening of the door PC according to a third-chosen law and the waves originating from the objects O present in this third area toward the antenna AER according to a chosen fourth law.

It will also be noted that each first law can be intended to cause a reflection of the waves along successive directions parallel to one another and constituting generatrixes of a cylinder of revolution having a radius chosen by at least one chosen area of at least one (configurable) metasurface MSj (in the case of FIG. 2), or a reflection along a single direction from chosen areas of at least one (configurable) metasurface MSj that are aligned on a chosen straight line (in the case of FIG. 1). In the example illustrated non-limitingly in FIG. 2, several areas of each configurable metasurface MSj reflect (and possibly modulate), at the same time or successively, the waves originating from the antenna AER, giving the impression that they have a helical movement due to the fact that in each area, there are sub-areas that act successively.

In the example illustrated non-limitingly in FIG. 1, several areas of each configurable metasurface MSj reflect (or modulate) the waves originating from the antenna AER, at the same time or successively (for example from left to right, or vice versa, in giving the impression that a sweep is being performed in the closed space EF). It is possible to envisage successively establishing the configuration resulting in the example of FIG. 1, then the configuration resulting in the example of FIG. 2 (or vice versa).

However, other first laws may be used, and in particular a first law allowing reflections in different directions, for example substantially contained in a truncated cone.

Figure 4:
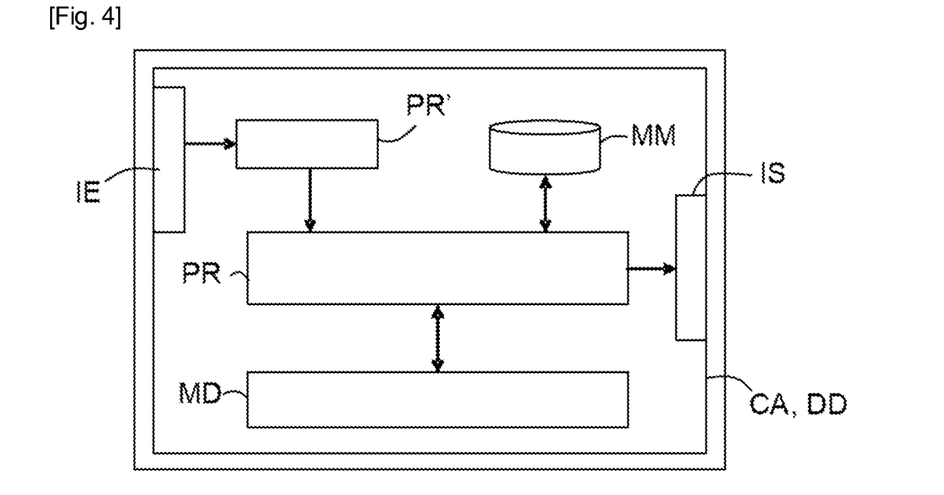

It will also be noted, as illustrated non-limitingly in FIG. 4, that the computer CA of the detection device DD, which already comprises the random access memory MD and the processor PR, may also comprise a mass memory MM, in particular for storing data defining the metallic environment and/or the configuration of the closed space EF, and intermediate data involved in all of its calculations and processing. Furthermore, this computer CA may also comprise an input interface IE for receiving at least the data defining the metallic environment and/or the configuration of the closed space EF, to use them in calculations or processing, possibly after having shaped and/or demodulated and/or amplified them, in a manner known per se, by means of a digital signal processor PR'. Moreover, this computer CA may also comprise at least one output interface IS, in particular for delivering definitions of the determined configurations and controlling the identification reader LI and each antenna AER (via application programming interfaces (or APIs) of the identification reader LI).

The invention claimed is:

1. A detection device for a system comprising a closed space with a metallic environment with at least one object within the closed space, the object being provided with a wave-transmitting/receiving identification element, said detection device comprising:
    an identification reader adapted to exchange messages with said identification element via at least one wave-transmitting/receiving antenna, said at least one wave-transmitting/receiving antenna being adapted to be installed in said closed space in order to detect the presence of said identification element, and
    at least one metasurface adapted to be installed in said closed space and configured in such a way as to reflect, according to at least one first-chosen law, waves that originate from said antenna and which are intended to be received by said identification element and to reflect, according to at least one second-chosen law, waves that originate from said identification element and which are intended to be received by said antenna,
    wherein each metasurface is configurable, each metasurface comprising a computer comprising at least one processor and at least one memory, said at least one processor and at least one memory being configured to perform operations of determining each first law and each second law as a function of said metallic environment and of a configuration of said closed space, then of determining each configuration of said configurable metasurface according to said first and second determined laws, and then of triggering an establishment of each configuration by said configurable metasurface.

2. The device according to claim 1, wherein said at least one processor and said at least one memory are configured to carry out operations of determining at least two first laws and a second law according to said metallic environment and said configuration of the closed space, then of determining a first configuration of said configurable metasurface as a function of one of said first determined laws and of said second determined law and a second configuration of said configurable metasurface as a function of the other of said first determined laws and of said second determined law, and then of triggering successive establishments of said first and second configurations by said configurable metasurface.

3. The device according to claim 1, wherein said at least one processor and said at least one memory are configured, in the event at least one door controlling access to said closed space is opened, to carry out operations of determining a third law of reflection of the waves that originate from said antenna toward an area comprising said access and a fourth law of reflection of the waves that originate from said area comprising the access to said antenna, then of determining a configuration of said configurable metasurface as a function of said determined third and fourth laws, and then of triggering an establishment of this configuration by said configurable metasurface.

4. The device according to claim 1, wherein each first law is intended to cause a reflection of said waves that is chosen from among a reflection along successive directions parallel to one another and constituting generatrixes of a cylinder of revolution having a radius chosen by at least one chosen area of said metasurface and a reflection along a single direction from chosen areas of said metasurface that are aligned on a chosen straight line.

5. The device according to claim 1, wherein said waves have frequencies belonging to the radiofrequency domain.

6. A system comprising a closed space with a metallic environment, wherein said closed space comprises at least one detection device according to claim 1.

7. The system according to claim 6, wherein said system comprises a vehicle.

8. The system according to claim 7, wherein said vehicle is a utility vehicle in which said closed space is defined by an at least partially metallic body and comprising an upper wall defining a roof and comprising an inner face on which each metasurface is secured, or said vehicle is a truck in which said closed space is a body, or said vehicle is a trailer that is at least partially metallic and comprising an upper wall defining a roof and comprising an inner face on which each metasurface is secured.

* * * * *